United States Patent [19]

Lippold et al.

[11] Patent Number: 4,948,113
[45] Date of Patent: * Aug. 14, 1990

[54] LIGHTTIGHT FILM-DELIVERY BOX

[75] Inventors: Steven R. Lippold, Oakfield; Matthew M. Branca, Rochester, both of N.Y.

[73] Assignee: Eastman Kodak Company, Rochester, N.Y.

[*] Notice: The portion of the term of this patent subsequent to Jan. 23, 2007 has been disclaimed.

[21] Appl. No.: 304,085

[22] Filed: Jan. 31, 1989

[51] Int. Cl.$^5$ .............................................. B65H 7/00
[52] U.S. Cl. .................................... 271/8.1; 271/145; 378/173
[58] Field of Search ................ 271/8.1, 145, 160, 277; 378/187, 188, 182, 173

[56] References Cited

U.S. PATENT DOCUMENTS

| | | | |
|---|---|---|---|
| 3,383,507 | 5/1968 | Brackett et al. | 378/188 |
| 3,958,693 | 7/1979 | Greene | 378/187 |
| 4,434,501 | 2/1984 | Pfeiffer | 378/187 |
| 4,807,867 | 2/1989 | Lippold et al. | 271/277 |

Primary Examiner—H. Grant Skaggs
Attorney, Agent, or Firm—Dennis P. Monteith

[57] ABSTRACT

A lighttight box, for automatically delivering a photosensitive sheet of photographic film to an exposure station, includes a lid movable between a first lighttight position and a second box-opening posiiton. A clamshell film-carrying mechanism, connected to the lid, is mounted for movement (1) from a closed position internal to the box when the lid is in its lighttight position, to (2) an open film-delivery position external to the box when the lid is in its box-opening position.

10 Claims, 6 Drawing Sheets

4,948,113

LIGHTTIGHT FILM-DELIVERY BOX

CROSS-REFERENCE TO A RELATED APPLICATION

Reference is hereby made to U.S. patent application Ser. No. 07/304,094 filed Jan. 31, 1989 in the name of S. Lippold and entitled A LIGHTTIGHT FILM-DELIVERY BOX AND ACTUATOR APPARATUS THEREFOR.

BACKGROUND OF THE INVENTION

1. Field of the Invention

The present invention relates generally to apparatus for handling sheet material. More particularly, the invention relates to a lighttight box for delivering a photosensitive sheet to a workstation.

2. Description of the Related Art

Many applications require the delivery of a flexible photosensitive sheet to a workstation, for example an exposure station. Apparatus, such as an electrostatic copier, a facsimile machine, color image reproduction apparatus, etc., often employs an exposure station in the form of a drum-type mechanism that automatically receives a photosensitive sheet of paper or film for an exposing operation.

Prior to an exposure, a photosensitive sheet needs to be handled in the dark or at least a low-light environment. A lack of light can be particularly troublesome to an operator during a loading operation, particularly if a photosensitive sheet is required to be mounted precisely for an exposure. This problem is alleviated significantly if the operator is required merely to place the photosensitive sheet into a lighttight sheet-delivery box or the like, which then delivers the sheet to a precise position at an exposure station. An operator can accomplish the initial sheet-loading task with relative ease when there is no need for precision placement of the sheet in the box other than a general alignment and orientation, i.e. width versus length and proper side up.

Those skilled in the art understand that a photosensitive sheet should be carefully handled, whether by sheet-delivery apparatus or by an operator, so as not to damage, by scratching, gouging, smudging, etc., its light-sensitive surface. Accordingly, a further desirable feature of lighttight sheet-delivery apparatus is that it be of the type that delivers the sheet automatically to a workstation without the need to engage, contact or otherwise handle its light-sensitive surface.

SUMMARY OF THE INVENTION

In view of the foregoing, an object of the invention is to provide apparatus for automatically delivering a photosensitive sheet to a workstation in a manner that obviates the need for handling the portion of the light-sensitive surface of the sheet to be exposed to an image.

This object is achieved by a lighttight box enclosing a photosensitive sheet, a major surface of the box being movable from a closed lighttight position to a box-opening position. A tray carries the enclosed sheet with its light-sensitive surface facing outwardly, away from the tray. A linkage, coupling the tray and the movable major surface, is hinged to the tray to cooperatively form the jaws of a clamshell-like mechanism that traps the enclosed sheet in an arch-like configuration. The linkage moves the tray, in response to movement of the major surface from its closed position to its box-opening position, from an initial position internal to the box wherein the jaws of the clamshell are closed to a final sheet-delivery position external to the box wherein the clamshell jaws are open.

By arching the sheet, the full leading edge of the sheet can be moved more readily into abutting engagement with a receiving surface of the workstation if the sheet is misaligned on delivery; furthermore, by arching the sheet, a somewhat greater tolerance can be permitted for parking the sheet-delivery box a given distance from the workstation when the sheet is actually delivered to the workstation. These advantages, as well as the advantage of delivering the photosensitive sheet to a workstation without handling its light-sensitive surface, will become more apparent in the detailed description of a preferred embodiment presented below.

BRIEF DESCRIPTION OF THE DRAWINGS

The invention will be described with reference to the accompanying drawings, wherein.

DETAILED DESCRIPTION OF A PREFERRED EMBODIMENT

Figure 1:
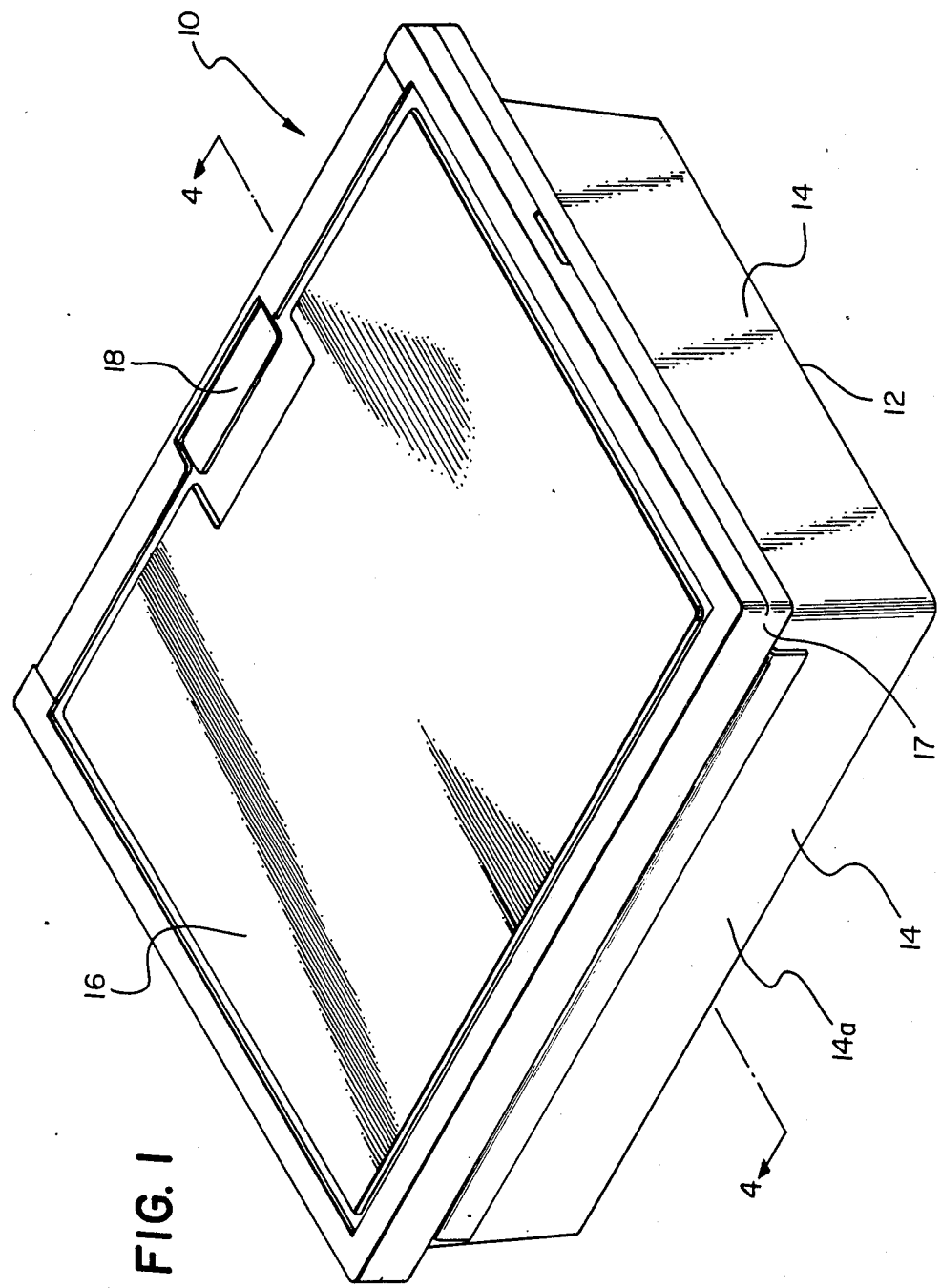
FIG. 1 is a perspective view of a lighttight box, in accordance with a preferred embodiment of the invention, in a closed position.

FIG. 1 shows a lighttight box 10, in accordance with a preferred embodiment of the invention, in a closed lighttight position. The box 10 serves preferably for delivering a photosensitive sheet of photographic film, of a size approximately 20 by 25 centimeters, to a film writer of color image reproduction apparatus (not shown). For that purpose, the box 10 forms a rigid rectangular receptacle having a flat bottom 12, four upright sides 14, and a cover or lid 16. A plastic molding, surrounding a peripheral edge of the lid 16, forms a living hinge 17 with the rearwardly facing side 14a of the box. A pivotal handle 18, located in a recess toward a forwardly facing edge of the lid 16, enables an operator to open the lid for placing a film sheet into, or removing the sheet from, the box 10.

Figure 2:
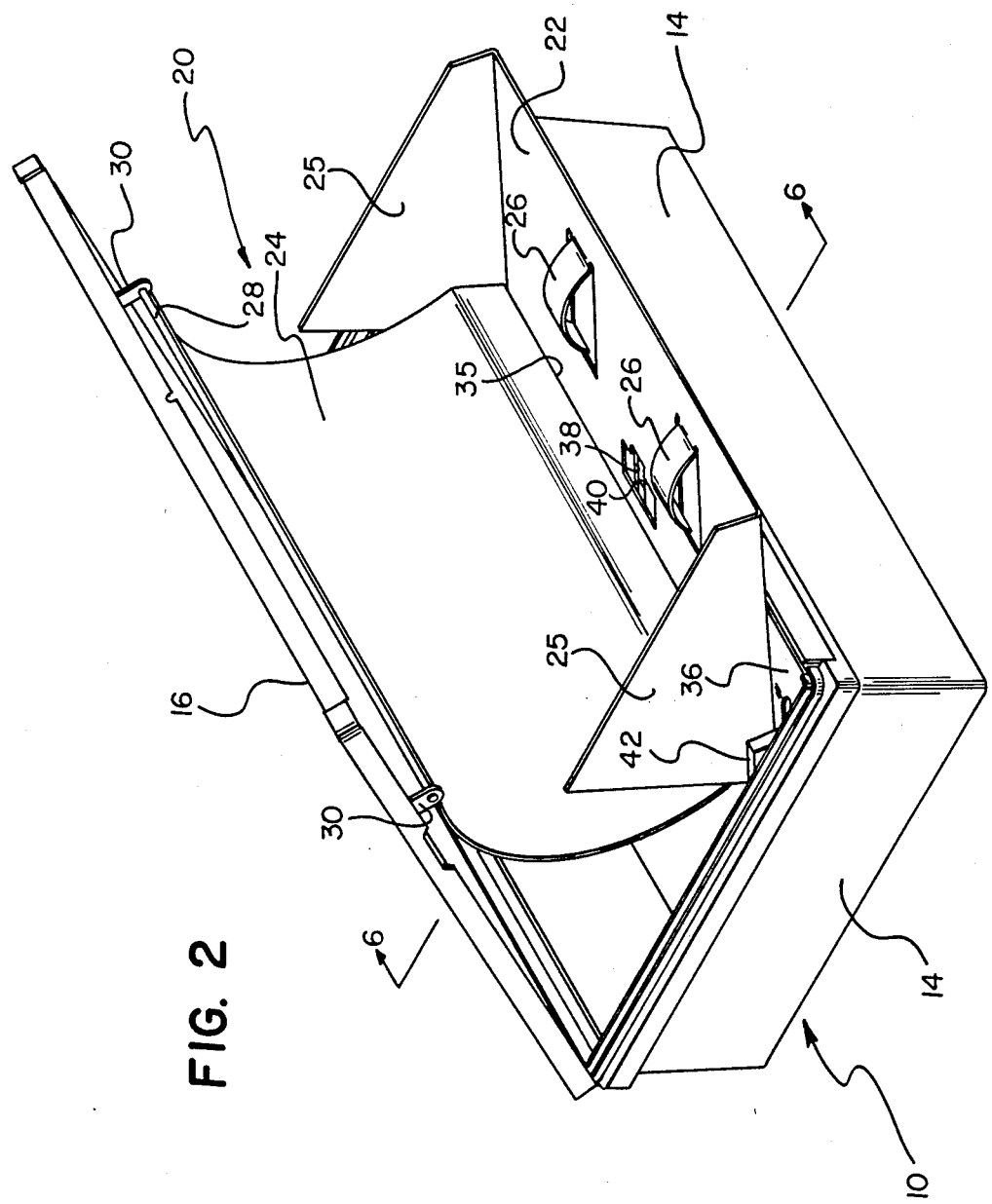
FIG. 2 is a perspective view of the lighttight box in an open position.

FIG. 2 shows the lid 16 in an open position. In its open position, the lid 16 uncovers a clamshell chute 20 which serves for delivering a film sheet to, or receiving the sheet from, a workstation such as the aforementioned film writer. An open-faced film-carrying tray 22 and a cooperating gently curved backing plate 24 form the respective jaws of the clamshell.

The tray 22 is made preferably of sheet metal. Opposite ends of the metal sheet are folded upwardly to form a pair of wing-like retaining sides 25 for centering a film sheet on the tray 22. A pair of curved rectangular bumps 26 serves, for a reason made apparent hereinafter, to lift a forwardly facing peripheral edge of film received when the box 10 is open.

Figure 3:
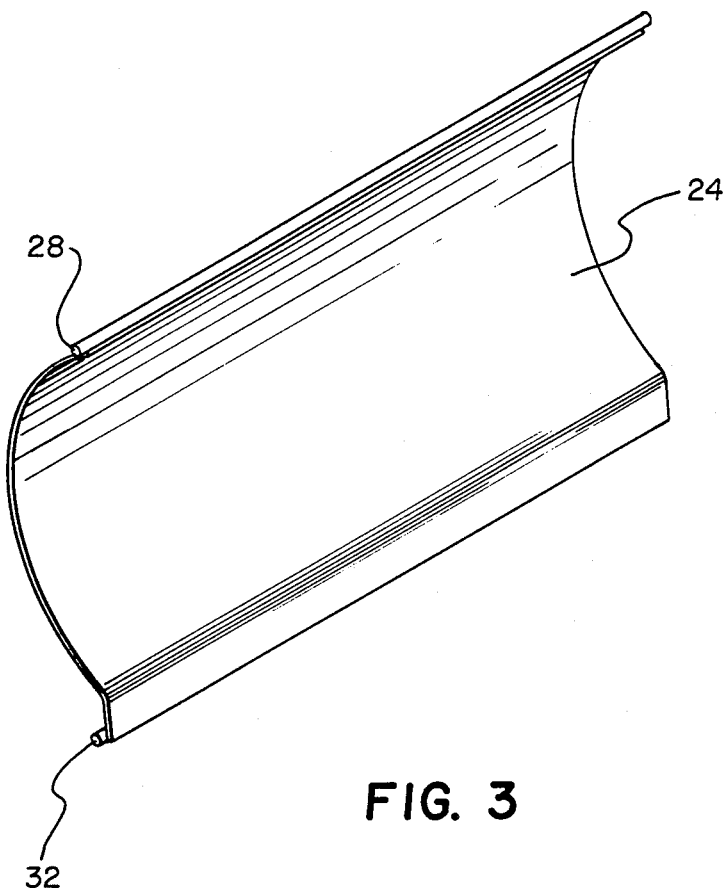
FIG. 3 is a perspective view of a curved backing plate of the box.

The backing plate 24, which is nested between the sides 25 and is shown by itself in FIG. 3, functions as a linkage coupling the lid 16 and the tray 22. To that end, a metal rod 28, preferably welded to the back of the plate 24 along its forwardly facing peripheral edge, serves as a hinge coupling the curved plate to the lid 16. For that purpose, opposing ends of the rod 28 are rotatably received in rounded holes formed in tabs 30 extending downwardly from opposite sides of the lid 16.

Figure 4:
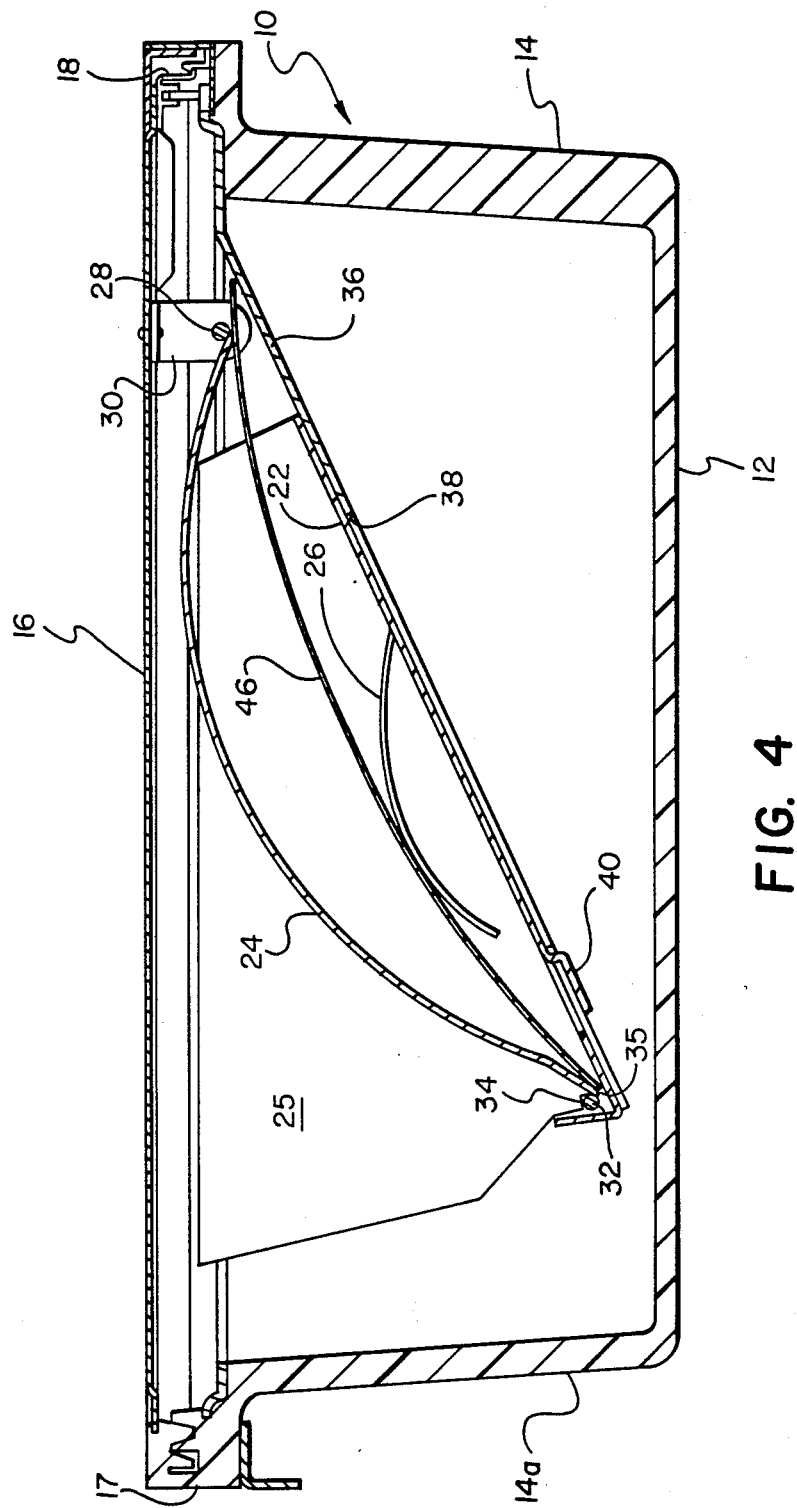
FIG. 4 is a cross-sectional view of the lighttight box taken along the lines 4—4 of FIG. 1.
Figure 6:
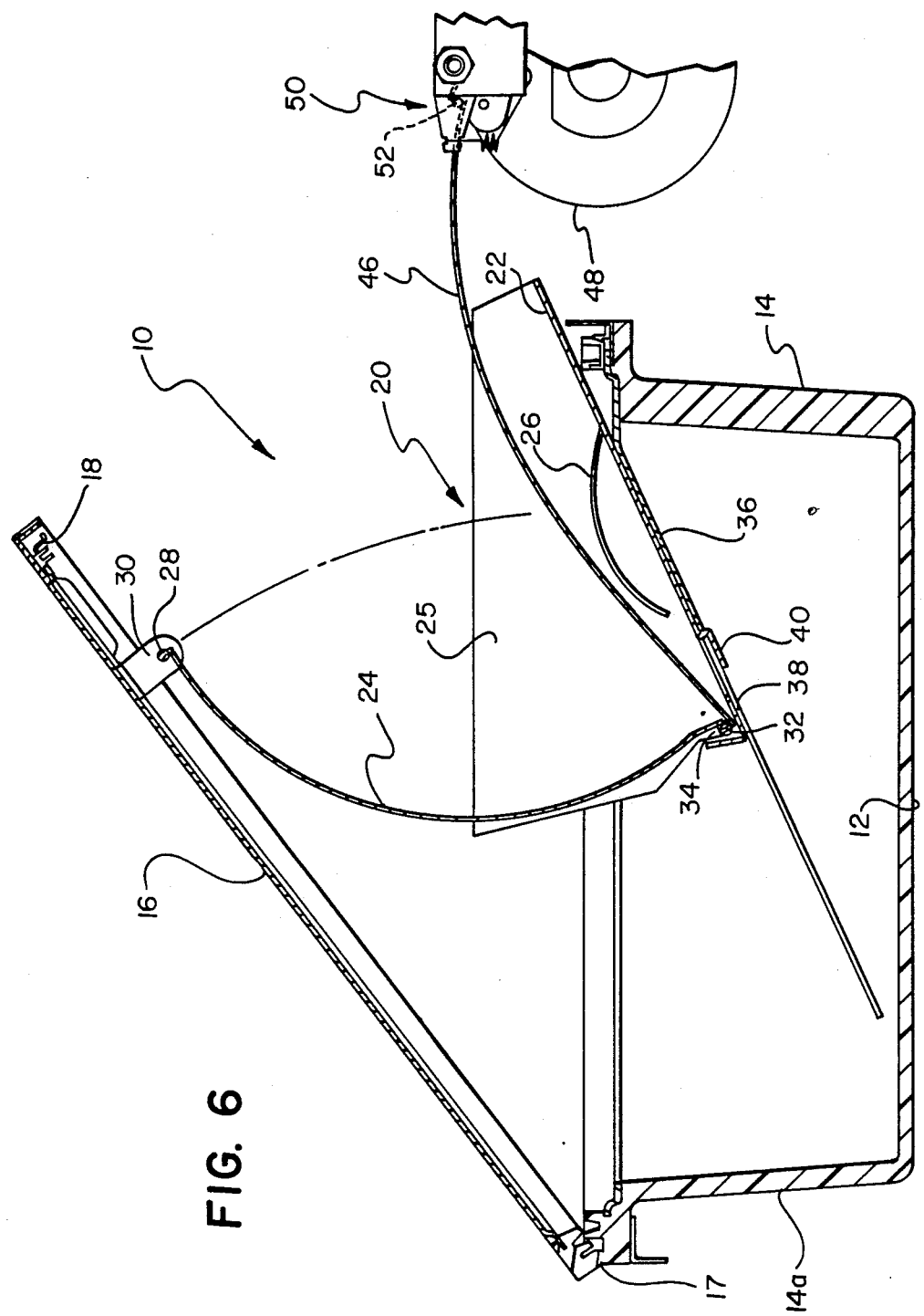
FIG. 6 is a cross-sectional view of the lighttight box taken along lines 6—6 of FIG. 2, showing the box delivering a sheet of photographic film to a rotatable drum of a film writer.

FIG. 3 further shows an elongate rod 32 welded to the back of the plate 24 along its downwardly or rearwardly facing edge. The rod 32, like the rod 28, serves as a hinge, only coupling the backing plate 24 to the tray 22. To that end, opposing ends of the rod 32 are rotatably seated in respective notches 34 cut from the lower rear corners of the sides 25 of the tray 22 (FIGS. 4 and 6). In doing so, the backing plate 24 and the tray 22 cooperatively form an elongate film trap 35 extending laterally along the lower back corner of the chute 20.

FIG. 4 shows the box 10 as having a stationary member 36 extending from the top front rim of the box linearly downwardly toward the lower back corner of the box. The member 36 functions as a ramp upon which the tray 22 slidably moves in response to opening and closing movement of the lid 16.

To that end, a tongue and groove combination serves for securing the tray 22 to the underside of the member 36. An elongate open-ended slot 38, cut from a central section in the lower half of the member 36, serves as the groove. A T-shaped central section 40 of the tray 22, between the bumps 26, is bent downwardly to form the tongue. The tongue 40 is somewhat wider than the slot 38 to hold the tray 22 against the member 36.

The chute 20 is biased laterally against a datum or reference point 42 for the purpose of accurately delivering film to a workstation. To that end, a coil spring 44, shown in FIGS. 5A and 5B, has opposing ends connected to corresponding sides of the tongue 40 and a depending tab 45 of the member 36.

In operation, an operator, in a suitable low- or no-light condition, opens the box 10 (FIG. 2) and inserts a peripheral edge of a photosensitive sheet of film into the trap 35. To that end, an operator positions the film in the box 10 with its light-sensitive surface facing upwardly. The film rests on the bumps 26 which only contact the back, non-photosensitive side of the film. With film in the box 10 and the lid 16 open, the trap 35, which captures the back peripheral edge of the film 46, and the bumps 26 cooperatively serve to lift the front peripheral edge of the film above the plane of the tray 22.

After inserting the film, the operator closes the lid 16 (FIG 4). In doing so, the front peripheral edge of the backing plate 24 pivots in the clockwise direction, as viewed in the drawing, about its hinge with the lid 16. As this pivoting movement occurs, the rod 32, welded to the backing plate 24, pulls the tray 22 linearly downwardly along the ramp-like member 36 into the box 10.

When the box 10 is closed, the jaws of the clamshell, i.e. the plate 24 and the tray 22, are closed; the front leading edge of the backing plate 24 and the ramp-like plate 36 trap the leading edge of the film 46 therebetween. As shown, the film 46 is held in place inside the box 10 in an arch-like configuration, with contact only being made to the front and trailing border areas of the film.

FIG. 6 illustrates the reverse operation, i.e. when the box 10 is opened, such as when film 46 is delivered, for example, to a rotatable drum 48 of a film writer 50. For that purpose, the lid 16 is moved (by means not shown) from its closed lighttight position (FIG. 4) to its open position (FIG. 6). As this initial opening movement occurs, the leading edge of the backing plate 24 is released from the film 46. Due to its resiliency, the front peripheral edge of the film 46 springs upwardly, under the influence of the bumps 26 and the capturing action of the trap 35, away from the plane of the ramp-like member 36. In this cantilevered position, the film 46 remains slightly arched under the influence of its own weight.

Figure 5A:
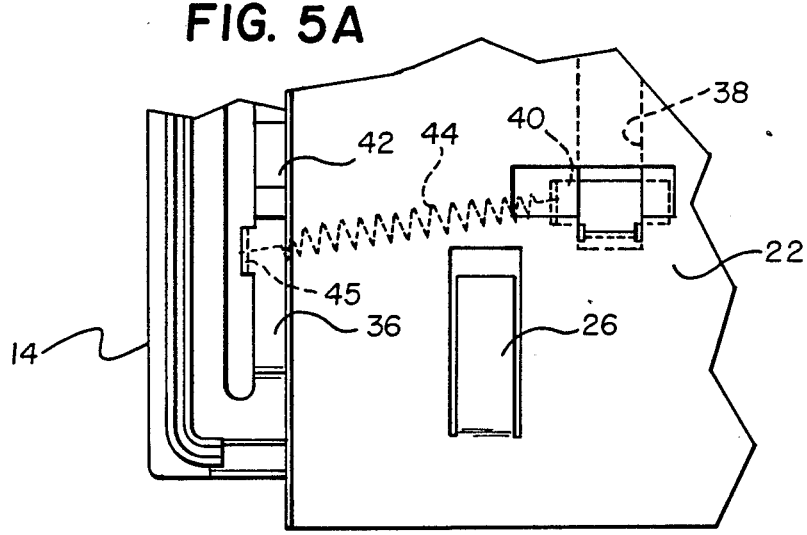
FIGS. 5A and 5B are partial top plan views of a film-carrying tray in an extended position and a retracted position, respectively.
Figure 5B:
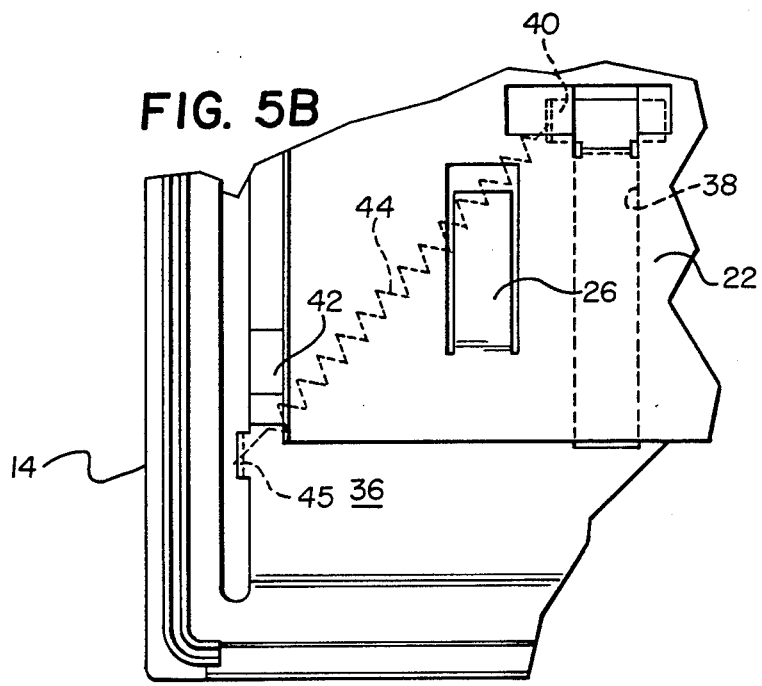

As box-opening movement continues, the lid 16 pulls the leading edge of the backing plate 24 upwardly along a circular path, shown in phantom. At the same time, the tray 22, which is held against the underside of the member 36 by means of the tongue 40, is pushed forwardly, under the influence of circular swinging movement of the plate 24, along the ramp-like member 36. In doing so, coil spring 44 biases the tray 22 laterally against datum 42 (FIGS. 5A and 5B).

The film 46 is wider than the front-to-back dimension of the tray 22. Accordingly, the leading peripheral edge of the film 46 leads the corresponding edge of the tray 22 as the clamshell chute 20 opens. With the lid 16 in its fully open position, the tray 22 extends outwardly from the box 10. The film 46, of course, extends not only beyond the leading edge of the tray 22, but is raised relative thereto under the influence of the bumps 26. This facilitates entry of the peripheral edge of the film 46 into the nip of a leading-edge clamp 52 of the film writer 50 (FIG. 6). Reference is hereby made to U.S. patent application Ser. No. 07/167,928, entitled SHEET HANDLING APPARATUS, now Patent No. 4,807,867 and assigned to the assignee of the subject invention, for descriptive details of how film writer 50 loads the film sheet onto the drum 48 for an exposure and, in turn, returns the film, for example, to the tray 22, following an exposure.

Apparatus for automatically opening the box 10 forms no part of the present invention and, accordingly, a description of such apparatus is not included herein. Reference, however, is made to the aforementioned U.S. patent application Ser. No. 07/304,094 entitled A LIGHTTIGHT FILM-DELIVERY BOX AND ACTUATOR APPARATUS THEREFOR for a detailed description of appropriate apparatus interfacing with the box 10 to effect film delivery to a film writer.

From the foregoing, it will be clear to those skilled in the art that box 10 offers clear and distinct advantages for delivering a sheet of film to a workstation. For example, by arching the film and raising it relative to the mouth of a clamshell film-delivering chute, design tolerances can be relaxed for parking the box relative to a workstation when the film is actually delivered thereto; moreover, by arching a film sheet, its full leading edge can be moved more readily into abutting engagement with a receiving surface of a workstation if the sheet is misaligned on delivery.

The invention has been described in detail with reference to the figures; however, it will be appreciated that variations and modifications are possible within the spirit and scope of the invention.

What is claimed is:

1. In a lighttight box for delivering a photosensitive sheet to a workstation, the improvement comprising:

(a) said box having a major surface movable between a first closed lighttight position and a second box-opening position;

(b) an internal tray arranged for carrying a photosensitive sheet with a forwardly facing peripheral edge extending beyond and raised relative to a corresponding edge of said tray; and (c) a linkage, coupling said movable major surface and said tray, responsive to movement of said major surface from its closed position to its box-opening position, for pushing said tray, respectively, from an initial position wherein the photosensitive sheet is internal to said box to a final sheet-delivery position wherein the photosensitive sheet is external to said box for delivering the forwardly facing edge of the sheet to a workstation in advance of and raised relative to a corresponding edge of said tray.

2. A lighttight box as defined in claim 1 wherein said movable major surface is a lid for said box.

3. A lighttight box as defined in claim 1 further including a member defining a ramp-like surface internal to said box, said tray being mounted for slidable movement along said member in response to movement of said major surface.

4. A lighttight box as defined in claim 3 wherein a forwardly facing peripheral edge of said tray extends beyond said ramp-like surface external to said box when said tray moves into its sheet-delivery position.

5. A lighttight box as defined in claim 3 wherein said member includes an elongate groove in its ramp-like surface, said lighttight box further including means, coupled to said tray through the groove of said member, for securing said tray to said member as said tray moves in the direction of the groove between its initial and its final position.

6. A lighttight box as defined in claim 3 wherein said linkage and said tray cooperatively define an elongate trap for receiving a rearwardly facing peripheral edge of the photosensitive sheet.

7. A lighttight box as defined in claim 6 wherein said movable major surface is a lid for said box, said lid and said ramp-like surface cooperating to trap the forwardly facing edge of the photosensitive sheet therebetween when said lid is in its closed position.

8. A lighttight box as defined in claim 7 wherein at least a portion of said tray defines a protuberance in the direction of the photosensitive sheet, to carry the sheet in an arched configuration.

9. In a lighttight box for delivering a photosensitive sheet to a workstation, the improvement comprising:

(a) said box having a major surface movable between a first lighttight position and a second box-opening position; and (b) a clamshell sheet-delivery mechanism, connected to said major surface, mounted for movement (1) from a closed position internal to said box when said major surface is in its lighttight position, to (2) an open sheet-delivery position external to said box when said major surface is in its box-opening position.

10. A lighttight box as defined in claim 9 wherein said clamshell mechanism includes an internal trap for retaining a trailing peripheral edge of a photosensitive sheet, and a protuberance, cooperating with said trap, for raising a leading peripheral edge of the sheet when said clamshell mechanism is in its sheet-delivery position.

* * * * *